US006450759B1

(12) United States Patent
Miller et al.

(10) Patent No.: US 6,450,759 B1
(45) Date of Patent: Sep. 17, 2002

(54) GAS TURBINE NOZZLE VANE INSERT AND METHODS OF INSTALLATION

(75) Inventors: William John Miller, Simpsonville, SC (US); Daniel Ross Predmore, Clifton Park, NY (US); James Michael Placko, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/788,328

(22) Filed: Feb. 16, 2001

(51) Int. Cl.$^7$ .............................. F01D 9/04; B64C 11/24

(52) U.S. Cl. ...................................... 415/115; 416/96 A (58) Field of Search ......................... 415/115; 416/96 A (56) References Cited

U.S. PATENT DOCUMENTS

| | | | | |
|---|---|---|---|---|
| 3,647,316 A | * | 3/1972 | Moskowitz | 416/231 R |
| 3,867,068 A | * | 2/1975 | Corsmeier et al. | 416/96 A |
| 4,413,949 A | * | 11/1983 | Scott | 416/96 A |
| 5,743,708 A | | 4/1998 | Cunha et al. | 415/115 |
| 5,762,471 A | * | 6/1998 | Cunha | 415/115 |
| 6,019,572 A | * | 2/2000 | Cunha | 415/114 |

FOREIGN PATENT DOCUMENTS

JP 149503 A * 7/1986 ............... 416/96 A

OTHER PUBLICATIONS

"39$^{th}$ GE Turbine State–of–the–Art Technology Seminar", Tab 1, ""F" Technology –the First Half–Million Operating Hours", H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA –An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.
"39th GE Turbine State–of–the–Art Technology Seminar", Tab 6, "GE Aeroderivative Gas Turbines –Design and Operating Features", M.W. Horner, Aug. 1996.
"39th GE Turbine State–of–the–Art Technology Seminar", Tab 7, "Advance Gas Turbine Materials and Coatings", P.W. Schilke, Aug. 1996.
"39th GE Turbine State–of–the–Art Technology Seminar", Tab 8, "Dry Low NO$_x$ Combustion Systems for GE Heavy –Duty Turbines", L. B. Davis, Aug. 1996.

(List continued on next page.)

Primary Examiner—John E. Ryznic
(74) Attorney, Agent, or Firm—Nixon & Vanderhye (57) ABSTRACT

A pair of hollow elongated insert bodies are disposed in one or more of the nozzle vane cavities of a nozzle stage of a gas turbine. Each insert body has an outer wall portion with apertures for impingement-cooling of nozzle wall portions in registration with the outer wall portion. The insert bodies are installed into the cavity separately and spreaders flex the bodies toward and to engage standoffs against wall portions of the nozzle whereby the designed impingement gap between the outer wall portions of the insert bodies and the nozzle wall portions is achieved. The spreaders are secured to the inner wall portions of the insert bodies and the bodies are secured to one another and to the nozzle vane by welding or brazing.

14 Claims, 3 Drawing Sheets

OTHER PUBLICATIONS

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994 –Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS Program), Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology, GE Introduces Advanced Gas Turbine Technology Platform: First to Reach 60% Combined–Cycle Power Plant Efficiency", Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century –"H" Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M.K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine –High Efficiency, Low Cost of Electricity and Low Emissions", Roger Schonewald and Patrick Marolda, (no date available),.

"Testing Program Results Validate GE's H Gas Turbine –High Efficiency, Low Cost of Electricity and Low Emissions", Slide Presentation –working draft, (no date available).

"The Next Step In H... For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31176—5628,.

"Utility Advanced Turbine System (ATS) Technology Readiness Testing —Phase 3", Document #666274, Oct. 1, 1996–Sep. 30, 1997, Publication Date, Dec. 31, 1997, Report Numbers: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Numbers: DOE/MC/31176—5340.

"Utility Advanced Turbine System (ATS) Technology Readiness Testing and Pre–Commercial Demonstration –Phase 3", Document #486132, Apr. 1–Jun. 30, 1976, Publication Date, Dec. 31, 1996, Report Numbers: DOE/MC/31176—5660.

"Utility Advanced Turbine System (ATS) Technology Readiness Testing and Pre–Commercial Demonstration —Phase 3", Document #587906, Jul. 1–Sep. 30, 1995, Publication Date, Dec. 31, 1995, Report Numbers: DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Numbers: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Numbers: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Numbers: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May, 1, 1999, Report Numbers: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Numbers DE–FC21–95MC31176—18.

"Utility Advanced Turbine Systems (ATS) Technology Readiness Testing –Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

GAS TURBINE NOZZLE VANE INSERT AND METHODS OF INSTALLATION

This invention was made with Government support under Contract No. DE-FC21-95MC31176 awarded by the Department of Energy. The Government has certain rights in this invention.

BACKGROUND OF THE INVENTION

The present invention relates to a gas turbine having a closed-circuit cooling system for one or more nozzle stages and particularly relates to a gas turbine having inserts for impingement-cooling of the nozzle vane walls and which inserts are sectional to facilitate installation into the nozzle vane cavities, with determinant impingement-cooling gaps between the inserts and the nozzle vane walls.

In advanced gas turbines, nozzle stages are often provided with a closed-circuit cooling system for cooling the nozzle vanes exposed to the hot gas path. For example, each nozzle vane may include a plurality of cavities extending between the outer and inner nozzle bands. Impingement-cooling inserts are provided in one or more cavities and a cooling medium such as steam is passed into the insert for flow through openings or apertures in the side walls of the insert for impingement-cooling the adjacent wall portions of the nozzle vane. An example of a closed-circuit steam-cooled nozzle for a gas turbine is disclosed in U.S. Pat. No. 5,743,708, of common assignee herewith, the disclosure of which is incorporated herein by reference.

Typically, the nozzle insert is a unitary body provided by an insert supplier and nominally sized for reception within the cavity of the nozzle vane. It will be appreciated that the insert is inserted into the vane cavity and provides an impingement gap between the interior wall of the nozzle and the wall of the insert. However, because of manufacturing tolerances involved with the nozzle cavity and the insert per se, as well as a need to be able to dispose the insert endwise into the nozzle cavity, variations from the designed impingement gap along the length of the insert and nozzle vane wall frequently occur. A variation in the impingement gap can, in turn, cause a significant change in the heat transfer between the nozzle vane walls and the cooling medium. For example, it has been found that a 0.010 inch variation in the gap from a nominal dimension can result in an approximate 13% reduction in heat transfer coefficient. Also, this percentage increases exponentially with further impingement gap variation. Further, installation of a unitary insert into the nozzle vane cavity is somewhat difficult, oftentimes requiring a custom fit, which requires hand bench standoffs individually formed and hence is increasingly costly. There is also a potential for low-cycle fatigue as a result of the variation in heat transfer coefficient caused by the varying impingement gap.

BRIEF SUMMARY OF THE INVENTION

In accordance with a preferred embodiment of the present invention, there is provided apparatus and methods for facilitating the disposition of an insert in a nozzle vane cavity to achieve a designed impingement gap between the internal wall of the nozzle and the wall of the insert, minimize or eliminate potential low-cycle fatigue problems and facilitate installation. To accomplish this, an insert comprised of two elongated hollow insert bodies is provided for installation separately within the nozzle cavity. Each insert body includes a hollow sleeve open at one end for receiving a cooling medium and closed at its opposite end. Each insert body also includes an outer wall portion having apertures through which an impingement cooling medium flows to impingement-cool registering wall portions of the nozzle, the remaining walls of the insert body being closed and without apertures. The insert bodies are configured for side-by-side disposition within the nozzle vane cavity with the walls containing the apertures in registration with the opposed wall portions of the nozzle vane. Inner wall portions of the bodies, when installed in the vane cavity, are spaced one from the other. The open ends of the bodies are also configured for securement of the bodies to one another in situ, i.e., within the nozzle vane cavity after installation. Standoffs are provided on each of the insert body walls containing the apertures. One or more spreaders are provided between the inner walls of the insert bodies to flex the bodies outwardly to engage the standoffs against the wall surfaces of the nozzle vane.

To install the insert bodies, the bodies are inserted into the nozzle vane cavity separately, thereby eliminating manufacturing tolerance stackup. After insertion, one or more spreaders are installed and joined to the insert bodies to engage the standoffs against the internal nozzle cavity walls, thus positively determining the designed impingement gap. The open inlet ends of the inserts can then be secured to one another and to the nozzle. By employing this configuration and installation procedure, the designed impingement gap is provided between the side wall portions of the insert bodies and the nozzle vane walls throughout the length of the vane. By installing the insert to the correct impingement gap, heat transfer is significantly improved with corresponding benefit to improved low-cycle fatigue life.

In a preferred embodiment according to the present invention, there is provided an insert for a cavity of a nozzle vane of a gas turbine for impingement-cooling of the walls of the vane, comprising a pair of elongated hollow insert bodies disposable in side-by-side relation to one another within the cavity, the bodies having a plurality of apertures through oppositely directed outer walls thereof, inner wall portions of the bodies being spaced from one another and at least one spreader disposable between the inner wall portions for maintaining the inner wall portions of the insert bodies spaced from one another.

In a further preferred embodiment according to the present invention, there is provided a nozzle for a gas turbine, comprising a nozzle vane having a plurality of cavities extending between outer and inner ends of the body and spaced from one another between leading and trailing edges of the vane, an insert in one of the cavities including a pair of elongated, hollow insert bodies in side-by-side relation to one another for receiving a cooling medium, each body having a plurality of apertures through oppositely directed outer walls thereof for flowing the cooling medium to impingement-cool registering side wall portions of the vane, the bodies having respective inner wall portions spaced from one another and at least one spreader disposed between the inner wall portions to maintain the inner wall portions spaced from one another.

In a still further preferred embodiment according to the present invention, there is provided a method of installing a cooling medium insert into a cavity of a nozzle vane for a gas turbine wherein the insert includes a pair of discrete elongated hollow insert bodies, each having an outer wall portion with a plurality of apertures therethrough, comprising the steps of inserting the discrete insert bodies into the vane cavity for disposition therein in side-by-side relation to one another, with the outer wall portions thereof in registration with side wall portions of the vane and inserting a spreader between spaced inner wall portions of the insert bodies to maintain the outer wall portions of the bodies spaced a predetermined distance from the side wall portions of the vane.

DETAILED DESCRIPTION OF THE INVENTION

Figure 1:
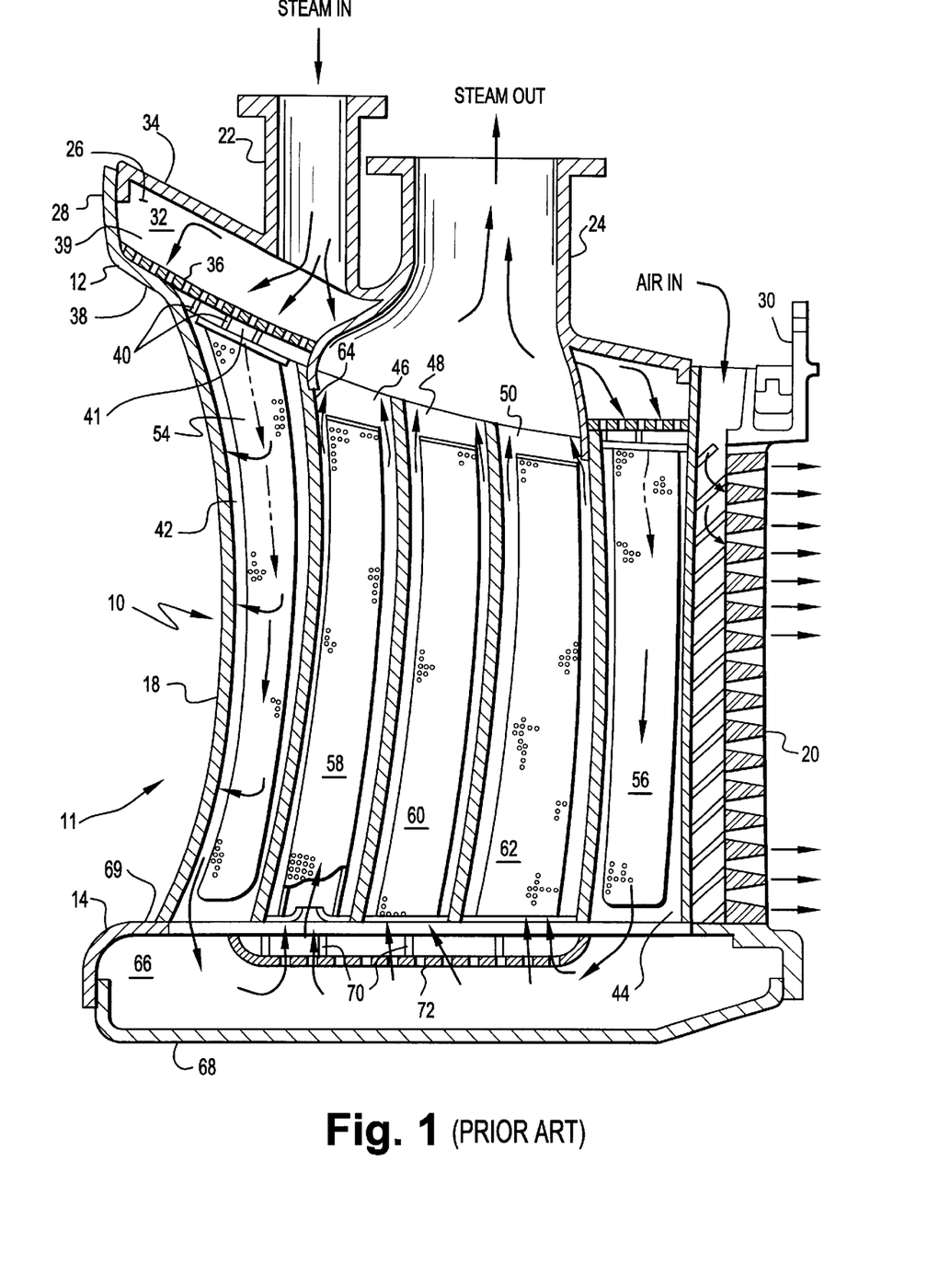
FIG. 1 is an enlarged cross-section of a first-stage nozzle vane as in the prior art.

As discussed previously, the present invention relates to closed cooling circuits for nozzle stages of a turbine, preferably a first-stage nozzle. Reference is made to the previously identified patent for disclosure of various other aspects of a turbine, its construction and methods of operation. Referring now to FIG. 1, there is schematically illustrated in cross-section a vane 10 comprising one of a plurality of circumferentially spaced vanes, each vane forming part of an arcuate segment 11 of a first-stage nozzle for a gas turbine. It will be appreciated that the segments 11 are connected one to the other to form an annular array of segments defining the hot gas path through the first-stage nozzle of the turbine. Each segment includes radially spaced outer and inner bands 12 and 14, respectively, with one or more of the nozzle vanes 10 extending between the outer and inner bands. The segments are supported about the inner shell of the turbine (not shown) with adjoining segments being sealed one to the other. For purposes of this description, the vane 10 will be described as forming the sole vane of a segment, it being appreciated that each segment 11 may have two or more vanes. As illustrated, the vane 10 has a leading edge 18 and a trailing edge 20.

The prior art cooling circuit for the illustrated first-stage nozzle vane segment of FIG. 1 has a cooling steam inlet 22 to the outer band 12. A return steam outlet 24 also lies in communication with the outer band of the nozzle segment. The outer band 12 includes an outer side railing 26, a leading railing 28, and a trailing railing 30 defining a plenum 32 with an upper cover 34 and an impingement plate 36 disposed in the outer band 12. (The terms outwardly and inwardly or outer and inner refer to a generally radial direction). Disposed between the impingement plate 36 and the inner wall 38 of outer band 12 are a plurality of structural ribs 40 extending between the side walls 26, forward wall 28 and trailing wall 30. The impingement plate 36 overlies the ribs 40 throughout the full extent of the plenum 32. Consequently, steam entering through inlet 22 into plenum 32 passes through the openings in the impingement plate 36 for impingement cooling of the outer wall 38 of the outer band 12, the outer band thus having first and second chambers 39 and 41 on opposite sides of the impingement plate.

Figure 5:
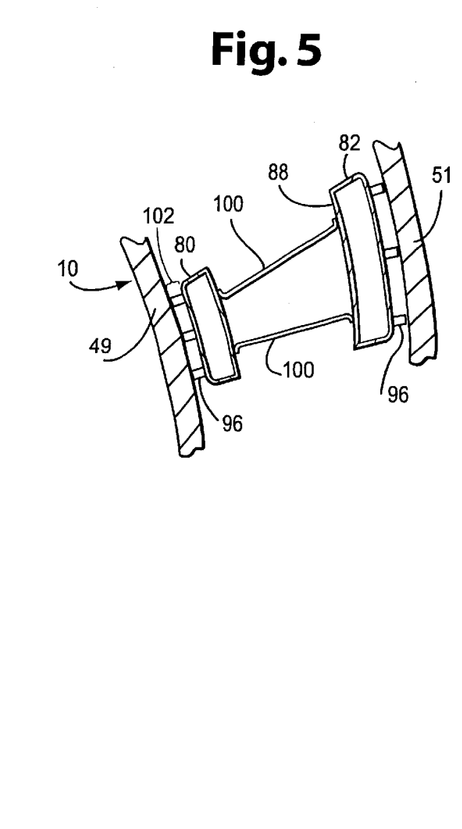
FIG. 5 is a cross-sectional view of the insert bodies and spreader taken generally about on line 5—5 in FIG. 4.

The first-stage nozzle vane 10 also has a plurality of cavities, for example, the leading edge cavity 42, an aft cavity 44, three intermediate return cavities 46, 48 and 50, and a trailing edge cavity 52. These cavities are defined by transversely extending ribs extending between opposite side walls 49 and 52 (FIG. 5) of the vane. One or more additional or fewer cavities may be provided.

Leading edge cavity 42 and aft cavity 44 each have an insert, 54 and 56 respectively, while each of the intermediate cavities 46, 48 and 50 have similar inserts 58, 60 and 62, respectively, all such inserts being in the general form of hollow sleeves. The inserts may be shaped to correspond to the shape of the particular cavity in which the insert is to be provided. The side walls of the sleeves are provided with a plurality of impingement cooling apertures, along portions of the insert which lie in opposition to the walls of the vane to be impingement cooled. For example, in the leading edge cavity 42, the forward edge of the insert 54 is arcuate and the side walls would generally correspond in shape to the side walls of the cavity 42, all such walls of the insert having impingement apertures. The back side of the sleeve or insert 54 in opposition to the rib 64 separating cavity 42 from cavity 46, however, does not have impingement apertures. In the aft cavity 44, on the other hand, the side walls, only, of the insert sleeve 56 have impingement apertures; the forward and aft walls of insert sleeve 56 being of a solid non-perforated material.

It will be appreciated that the inserts received in cavities 42, 44, 46, 48, and 50 are spaced from the walls of the cavities to enable a cooling medium, e.g., steam, to flow through the impingement apertures to impact against the interior wall surfaces of the nozzle vane, thus cooling those wall surfaces. As apparent from the ensuing description, inserts 54 and 56 are closed at their radially inner ends and open at their radially outer ends. Conversely, inserts 58, 60 and 62 are closed at their radially outer ends and open at their radially inner ends.

As illustrated in FIG. 1, the post-impingement cooling medium, e.g., steam cooling the outer wall 38 flows into the open radially outer ends of inserts 54 and 56 for impingement-cooling of the vane walls in registration with the impingement apertures in the inserts along the length of the vane. The spent impingement steam then flows into a plenum 66 in the inner band 14 which is closed by an inner cover plate 68. Structural strengthening ribs 70 are integrally cast with the inner wall 69 of band 14. Radially inwardly of the ribs 70 is an impingement plate 72. As a consequence, it will be appreciated that the spent impingement cooling steam flowing from cavities 42 and 44 flows into the plenum 66 and through the impingement apertures of impingement plate 72 for impingement cooling of the inner wall 69. The spent cooling steam flows by direction of the ribs 70 towards openings in ribs 70 (not shown in detail) for return flow to the steam outlet 24. Particularly, inserts 58, 60 and 62 are disposed in the cavities 46, 48, and 50 in spaced relation from the side walls and ribs defining the respective cavities. The impingement apertures of inserts 58, 60 and 62 lie along the opposite sides thereof in registration with the vane walls. Thus, the spent cooling steam flows through the open inner ends of the inserts 58, 60 and 62 and through the impingement apertures for impingement cooling the adjacent side walls of the vane. The spent cooling steam then flows out the outlet 24 for return, e.g., to the steam supply, not shown.

The air cooling circuit of the trailing edge cavity of the combined steam and air cooling circuits of the vane illustrated in FIG. 1 generally corresponds to the cooling circuit disclosed in the above-identified patent. Therefore, a detailed discussion thereof is omitted.

Figure 2:
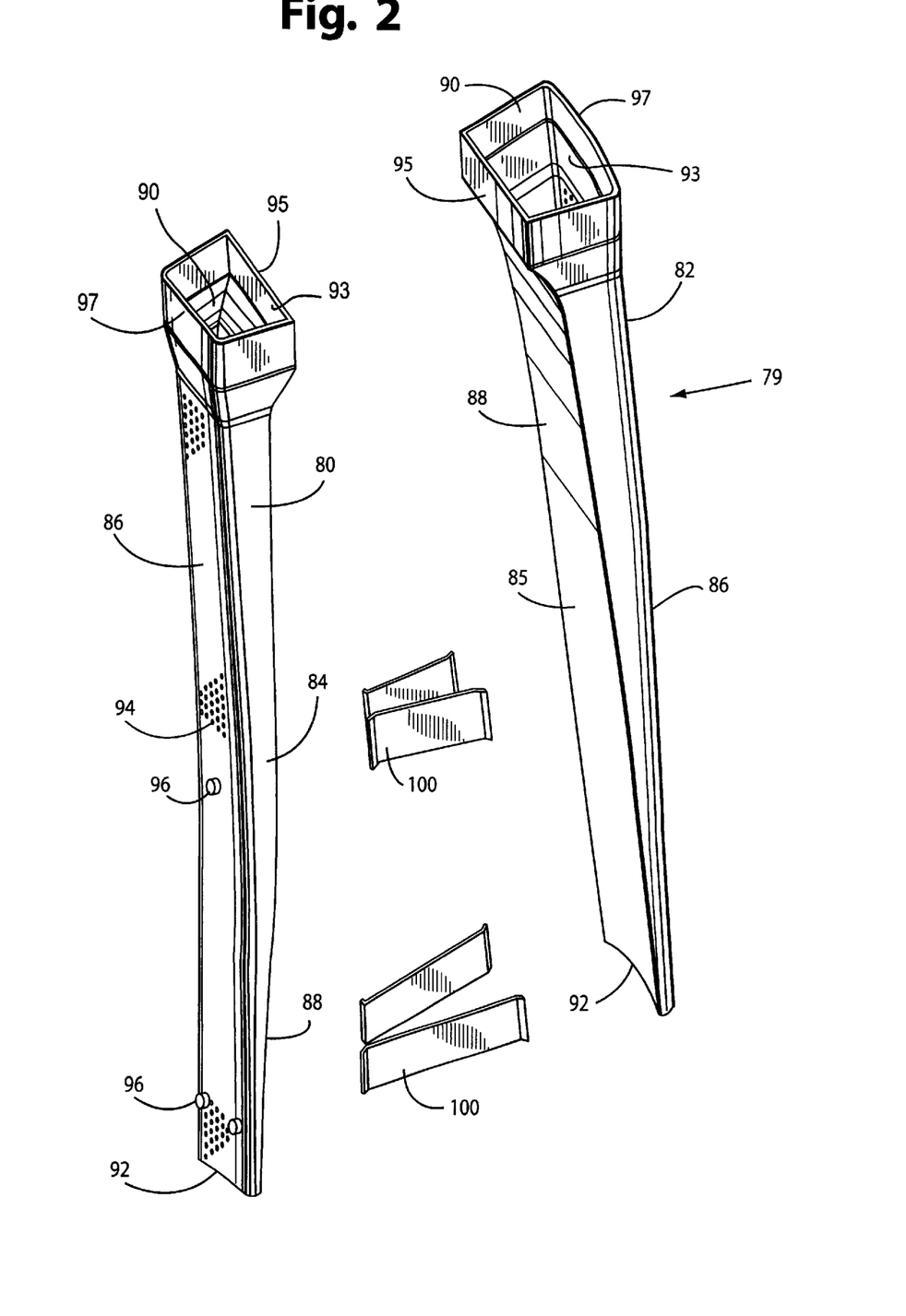
FIG. 2 is an exploded perspective view of a pair of insert bodies and spreaders constructed in accordance with the present invention and prior to installation into a nozzle vane cavity.

As noted previously, the inserts in the cavities define an impingement gap between the apertured walls of the insert and the adjacent nozzle wall portions which can vary significantly from a designed gap resulting in variations of heat transfer and lower life-cycle fatigue. Those problems are caused by stackup of manufacturing tolerances, difficulty in installation of the inserts and the resulting variation from the designed impingement gap. In accordance with the present invention, there is provided an insert, generally designated 79 and illustrated in FIG. 2, comprised of a pair of discrete insert bodies 80 and 82. Insert bodies 80 and 82 comprise respective hollow elongated sleeves 84 and 85, each having an outer side wall 86 and an inner wall 88. Each body 80 and 82 has an open end 90 of generally rectilinear configuration. The outer side wall 86 and inner wall portion 88 of each insert body generally converge toward one another from the open end 90 to the closed opposite end 92. The outer side wall 86 of each insert body 80 and 82 has a plurality of apertures 94 for passing a cooling medium received within the body through opening 90 toward the registering side wall portions of the nozzle vane when the insert is disposed in the nozzle. Additionally, end portions 93 of bodies 80 and 82 have inner wall portions 95 adjacent the open ends of the insert bodies are configured to abut one another whereby the bodies can be joined one to the other after installation into the nozzle cavity by a welding or brazing operation. The outer edges 97 about the open ends 90 of the bodies are also configured for securement to the nozzle per se after installation, also by a welding or brazing operation. Standoffs 96 are provided at various locations along the outer wall 86 of each body 80 and 82. The standoffs 96 comprise projections which project from the outer wall surface for engagement with the interior wall surface of the nozzle wall when installed.

Figures 3, 4:
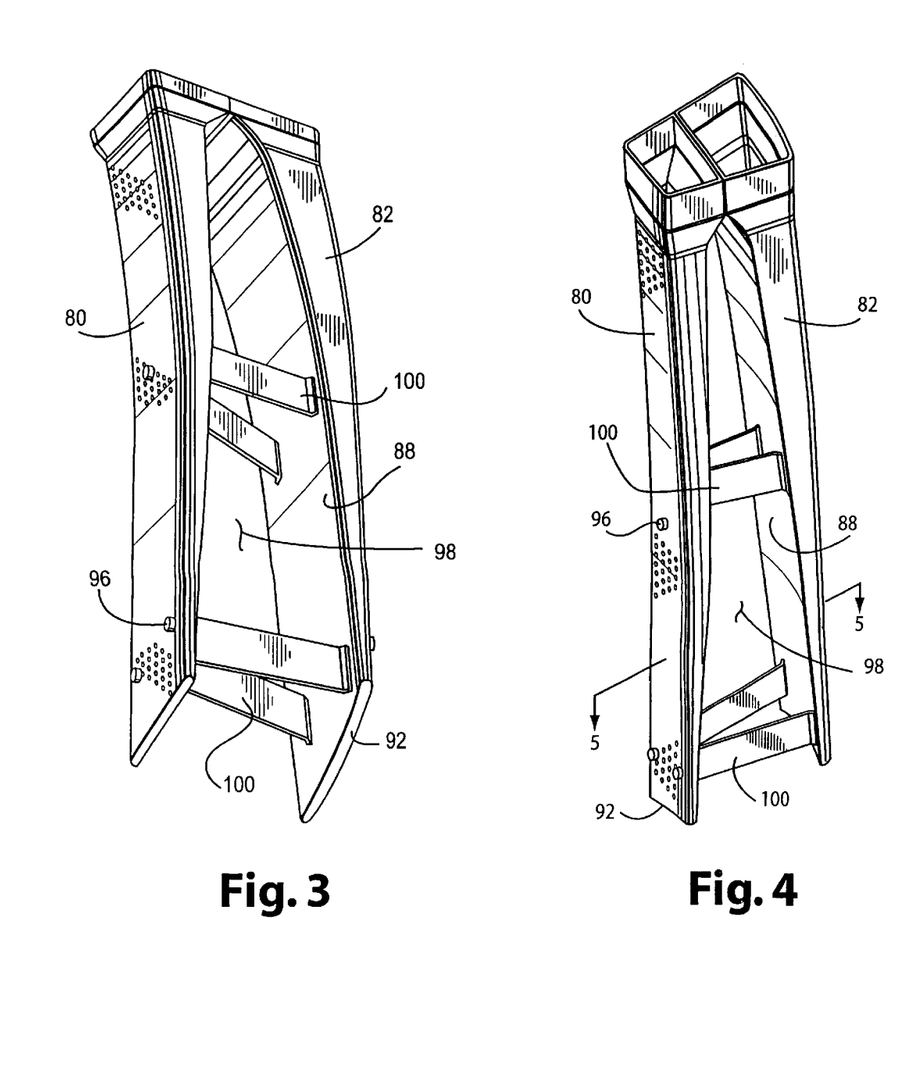
FIG. 3 is a perspective view of the insert hereof as it would appear within the nozzle vane cavity.
FIG. 4 is a perspective view similar to FIG. 3.

The inner wall portion 88 of each body 80, 82 is tapered from its open end 90 toward the outer wall 86 and toward the opposite end 92 of each body. Consequently, a gap 98 (FIG. 3) is provided between the insert bodies upon installation within the nozzle cavity. Spreaders 100 are provided upon installation for maintaining the standoffs 96 engaged against the inner wall surfaces of the nozzle vane wall. It will be appreciated that one or more spreaders 100 may be provided at longitudinal positions along the length of the insert bodies 80 and 82. From a review of FIG. 5, it will be appreciated that the insert bodies 80 and 82 are not identical to one another. Thus, as illustrated, insert body 80 is narrower in a chordal direction than insert body 82 in accordance with their disposition adjacent the concave and convex sides, respectively, of the vane.

To install the insert into a cavity, each insert body 80 and 82 is inserted separately into the cavity with the open ends 90 of the bodies aligned with one another and with the nozzle wall to which the bodies will be secured. After insertion of each body, one or more spreaders 100 are disposed between the inner wall portions 88 of the bodies. The bodies are thus flexed outwardly away from one another to engage the standoffs 96 against the inner wall surfaces of the nozzle vane. Once correctly positioned, the spreaders 100 can be secured to the inner walls 88, for example, by welding or brazing. The open end 90 of each insert body 80 and 82 is then secured to one another and to the surrounding nozzle wall by brazing or welding. As a consequence of this installation procedure, the designed impingement gap 102 (FIG. 5) between the outer wall 86 of each insert body and the opposing wall surface of the nozzle vane is obtained. It will be appreciated that the insert bodies are inserted into a vane cavity through openings in the inner or outer band depending upon the direction of the flow of the cooling medium within the cavity, the open end 90 being at the cooling medium inlet end of the cavity.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An insert for a cavity of a nozzle vane of a gas turbine for impingement-cooling of the walls of the vane, comprising:
   a pair of elongated hollow insert bodies disposable in side-by-side relation to one another within the cavity, said bodies having a plurality of apertures through oppositely directed outer walls thereof, inner wall portions of the bodies being spaced from one another; and
   a plurality of spreaders extending between said inner wall portions of said bodies and at spaced locations along the lengths of said bodies for maintaining said inner wall portions of said insert bodies spaced from one another.

2. An insert according to claim 1 including standoffs spaced from one another along said outer walls of said bodies and extending outwardly from said outer walls for engagement with the walls of said vane.

3. An insert according to claim, 1 wherein each of said bodies has an open end for receiving a cooling medium for flow therethrough and through said apertures along said outer walls for impingement-cooling nozzle walls in registration with the apertures.

4. An insert according to claim 3 wherein ends of each of said bodies opposite said open ends thereof are closed.

5. An insert for a cavity of a nozzle vane of a gas turbine for impingement-cooling of the walls of the vane, comprising:
   a pair of elongated hollow insert bodies disposable in side-by-side relation to one another within the cavity, said bodies having a plurality of apertures through oppositely directed outer walls thereof, inner wall portions of the bodies being spaced from one another; and
   at least one spreader disposable between said inner wall portions for maintaining said inner wall portions of said insert bodies spaced from one another, end portions of said bodies having inner wall surfaces for engagement with one another to facilitate securement of said bodies to one another.

6. An insert for a cavity of a nozzle vane of a gas turbine for impingement-cooling of the walls of the vane, comprising:
   a pair of elongated hollow insert bodies disposable in side-by-side relation to one another within the cavity, said bodies having a plurality of apertures through oppositely directed outer walls thereof, inner wall portions of the bodies being spaced from one another; and
   at least one spreader disposable between said inner wall portions for maintaining said inner wall portions of said insert bodies spaced from one another, end portions of said bodies having inner wall surfaces for engagement with one another to facilitate securement of said bodies to one another, said inner wall surfaces lying adjacent common end portions of said bodies, said bodies extending from said end portions and being cantilevered therefrom.

7. An insert for a cavity of a nozzle vane of a gas turbine for impingement-cooling of the walls of the vane, comprising:

a pair of elongated hollow insert bodies disposable in side-by-side relation to one another within the cavity, said bodies having a plurality of apertures through oppositely directed outer walls thereof, inner wall portions of the bodies being spaced from one another; and a plurality of spreaders extending between said inner wall portions of said bodies and at spaced locations along the lengths of said bodies for maintaining said inner wall portions of said insert bodies spaced from one another.

8. A nozzle vane according to claim 7 wherein each insert body includes at least one standoff extending outwardly from said outer wall thereof for engagement with an opposed side wall portion of said vane.

9. A nozzle vane according to claim 7 wherein said bodies are secured to one another and to said nozzle vane body.

10. A nozzle vane according to claim 7 wherein each of said bodies has an open end for receiving a cooling medium for flow therethrough and through said apertures along said outer walls for impingement-cooling said side wall portions of the vane, end portions of each of said bodies opposite said open ends thereof being closed.

11. A nozzle vane according to claim 7 wherein each insert body includes at least one standoff extending outwardly from said outer wall thereof for engagement with an opposed side wall portion of said vane, said spreaders maintaining said standoffs in engagement with the side wall portions of said vane to maintain a predetermined gap between said outer walls of said insert bodies and said side wall portions of said vane.

12. A method of installing a cooling medium insert into a cavity of a nozzle vane for a gas turbine wherein the insert includes a pair of discrete elongated hollow insert bodies, each having an outer wall portion with a plurality of apertures therethrough and standoffs, comprising the steps of:

(a) inserting the discrete insert bodies into the vane cavity for disposition therein in side-by-side relation to one another, with the outer wall portions thereof in registration with side wall portions of said vane; and (b) subsequent to step (a), and while the bodies remain in the vane cavity, inserting a spreader between spaced inner wall portions of said insert bodies to flex said bodies in response to insertion of said spreader between said bodies to engage the standoffs with the side wall portions of the vane and maintain the outer wall portions of said bodies spaced a predetermined distance from said side wall portions of said vane.

13. A method according to claim 12 wherein each of the bodies has an open end for receiving a cooling medium and including the step of securing the bodies to one another adjacent said open ends thereof.

14. A method according to claim 12 wherein each of the bodies has an open end for receiving a cooling medium and including the step of securing the bodies to said nozzle vane.

* * * * *